United States Patent
Strömberg

(10) Patent No.: US 12,416,983 B2
(45) Date of Patent: Sep. 16, 2025

(54) LINK INTENDED FOR A FLEXIBLE MAT IN A POINTING DEVICE

(71) Applicant: TRAPPER HOLDING AB, Järfälla (SE)

(72) Inventor: Rolf Eric Ragnar Strömberg, Skä (SE)

(73) Assignee: TRAPPER HOLDING AB, Järfälla (SE)

( * ) Notice: Subject to any disclaimer, the term of this patent is extended or adjusted under 35 U.S.C. 154(b) by 21 days.

(21) Appl. No.: 18/562,636

(22) PCT Filed: May 20, 2022

(86) PCT No.: PCT/SE2022/000003
§ 371 (c)(1),
(2) Date: Nov. 20, 2023

(87) PCT Pub. No.: WO2022/245263
PCT Pub. Date: Nov. 24, 2022

(65) Prior Publication Data
US 2024/0281076 A1    Aug. 22, 2024

(30) Foreign Application Priority Data
May 21, 2021  (SE) .................................. 2100082-3

(51) Int. Cl.
*G06F 3/0362*   (2013.01)
(52) U.S. Cl.
CPC .................. *G06F 3/0362* (2013.01)
(58) Field of Classification Search
CPC . G06F 3/03547; G06F 3/03548; G06F 3/0362
See application file for complete search history.

(56) References Cited

U.S. PATENT DOCUMENTS

| 5,270,690 A | 12/1993 | Oberg |
| 2004/0169634 A1* | 9/2004 | Stromberg ............ G06F 3/0354 345/156 |

(Continued)

FOREIGN PATENT DOCUMENTS

| EP | 1642202 A1 | 4/2006 |
| SE | 0201694 L | 12/2003 |
| WO | 2014/185847 A1 | 11/2014 |

OTHER PUBLICATIONS

International Search Report for PCT/SE2022/000003 mailed Oct. 24, 2022.

*Primary Examiner* — Hang Lin
(74) *Attorney, Agent, or Firm* — Mark T. Vogelbacker; Eckert Seamans Cherin & Mellott, LLC

(57) ABSTRACT

Links (5a-m), preferably intended for, but not limited to, manufacturing a flexible mat (2) for use in an electronic device such as a pointing device, arranged to control the movement of a pointer/cursor on a monitor/display at, for example, a computer or similar device, and where at least one of the links (5a-m) is substantially rigid in its longitudinal direction. The at least one link (5a-m) can be consisting of, or are made of, a substantially disc-shaped material, and having a base portion (10) extending in the longitudinal/axial direction of the link (5a-m). The at least one link (5a-m) can include at least one, preferably a plurality of, coupling means (7a,b), connected to or integrated in, the base portion (10) of the link (5a-m).

20 Claims, 8 Drawing Sheets

(56) References Cited

U.S. PATENT DOCUMENTS

2006/0279540 A1* 12/2006 Stromberg .......... G06F 3/03548
 345/157
2019/0369746 A1* 12/2019 Nien ..................... G06F 3/02
2023/0236678 A1* 7/2023 Strömber Ragnar .......................
 G06F 3/03548
 345/156

* cited by examiner

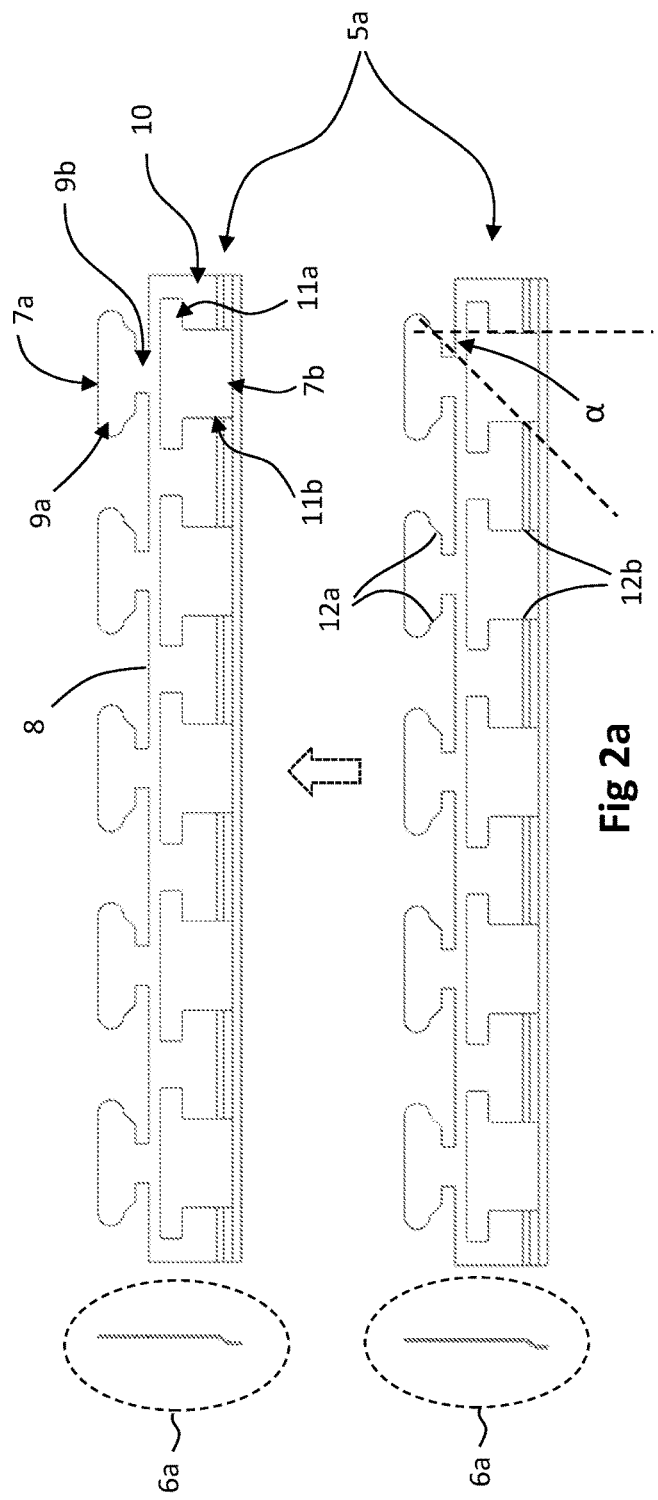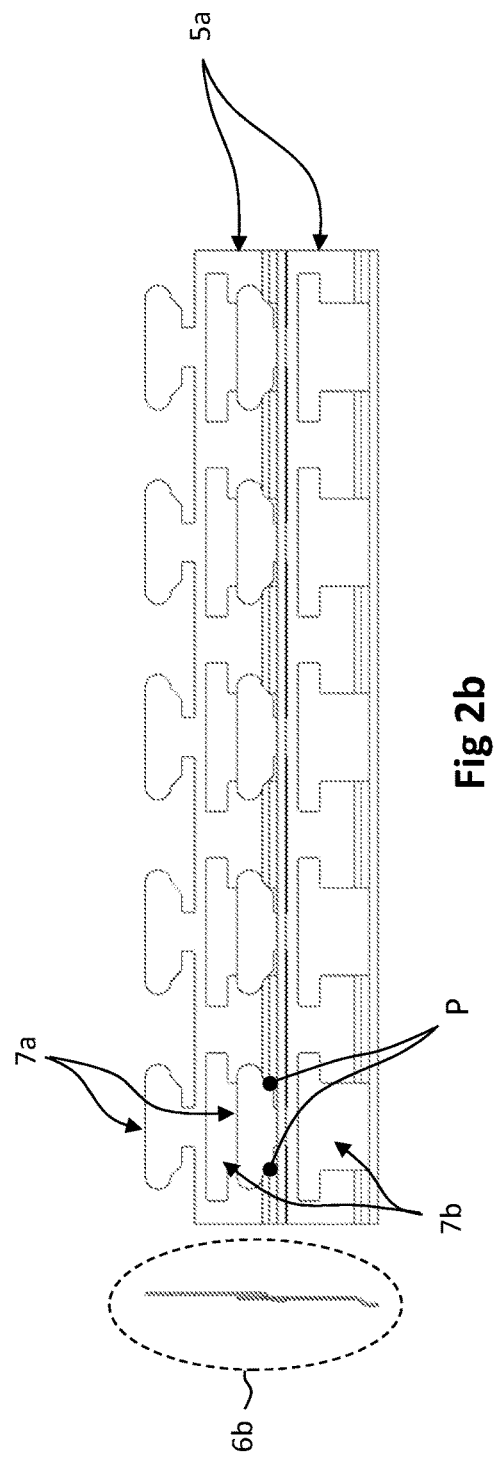
Fig 2a
Fig 2b

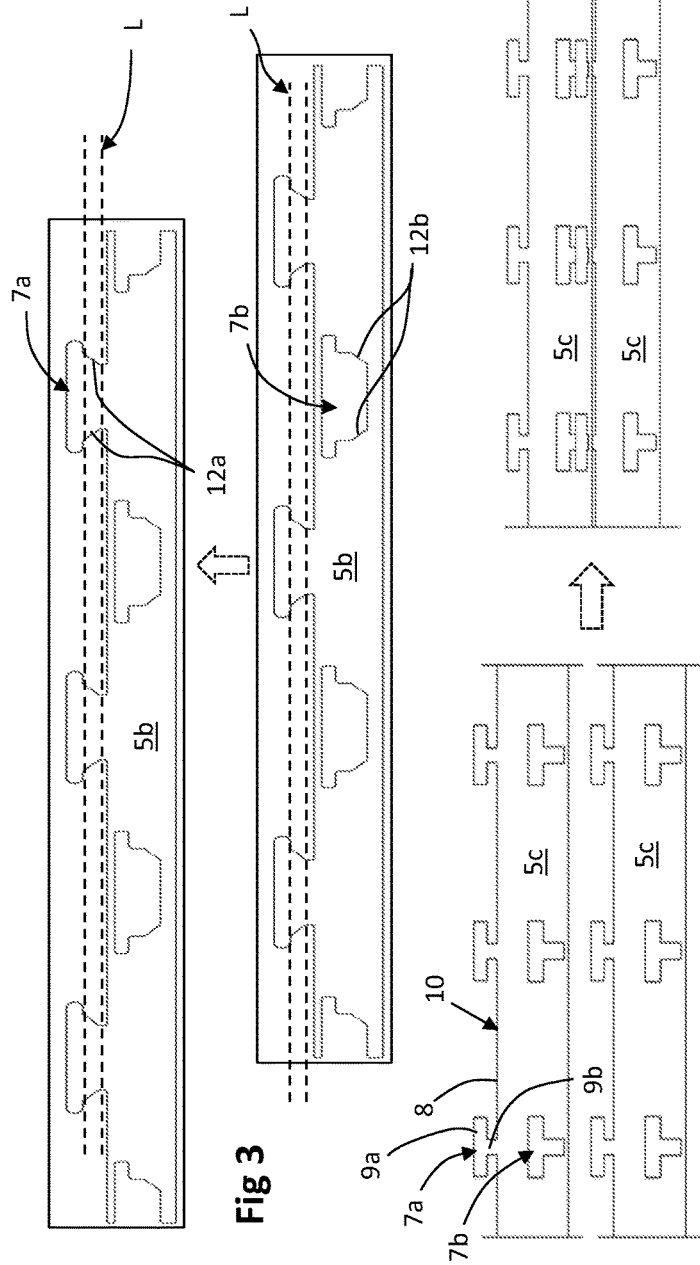
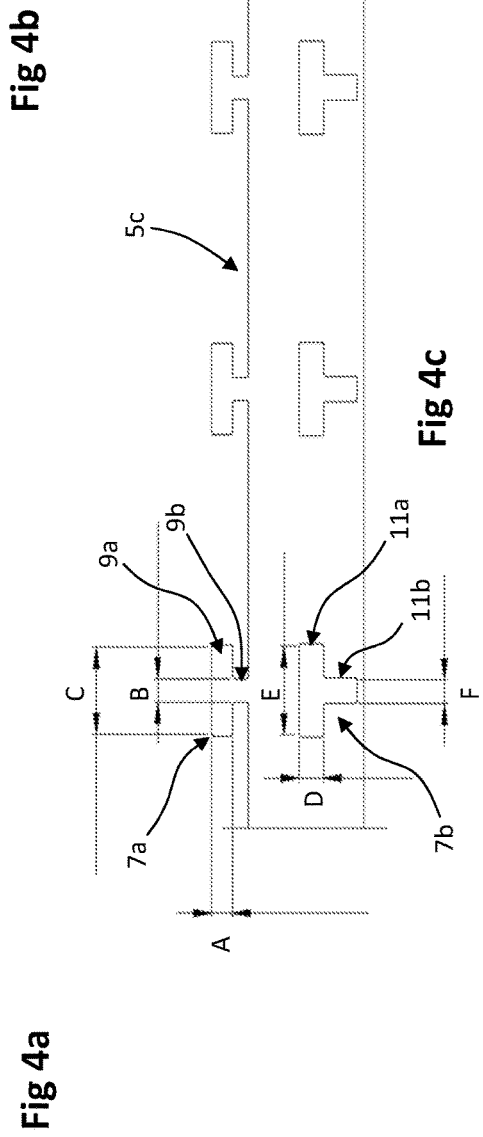
Fig 3
Fig 4a
Fig 4b
Fig 4c

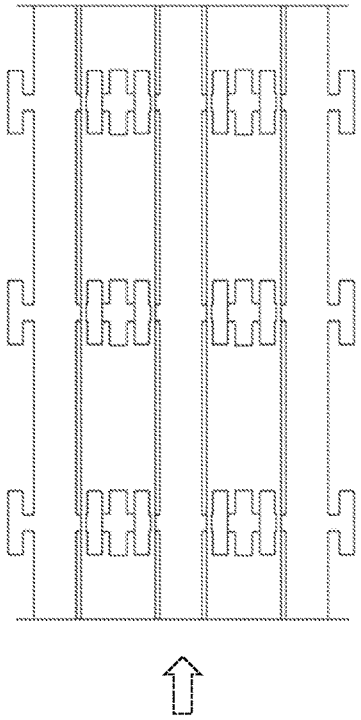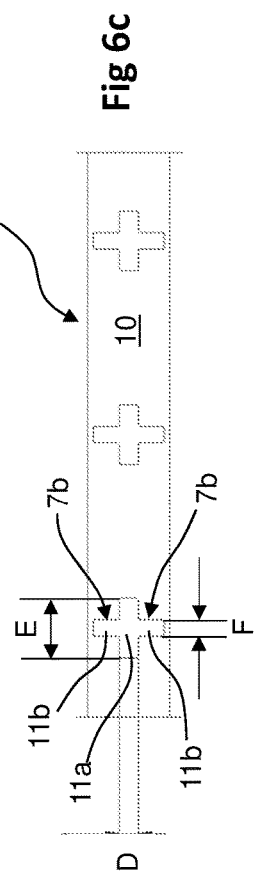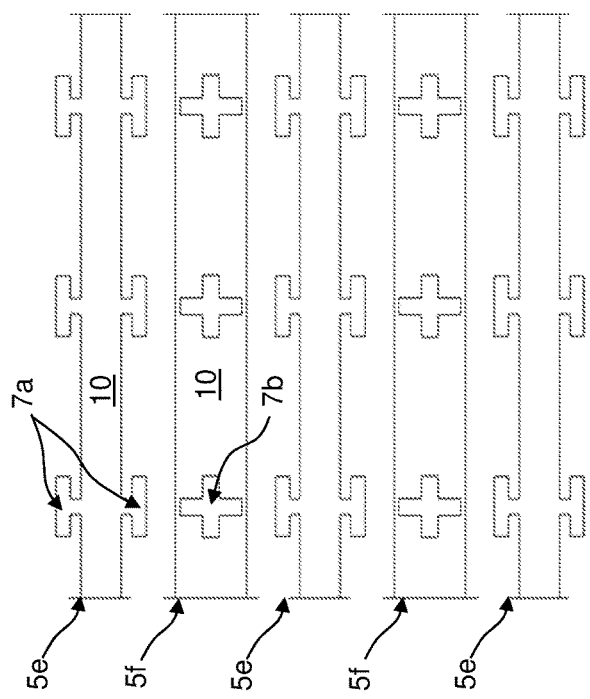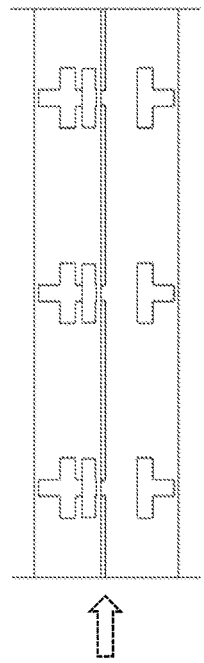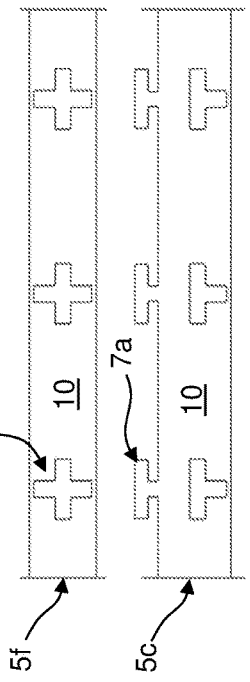

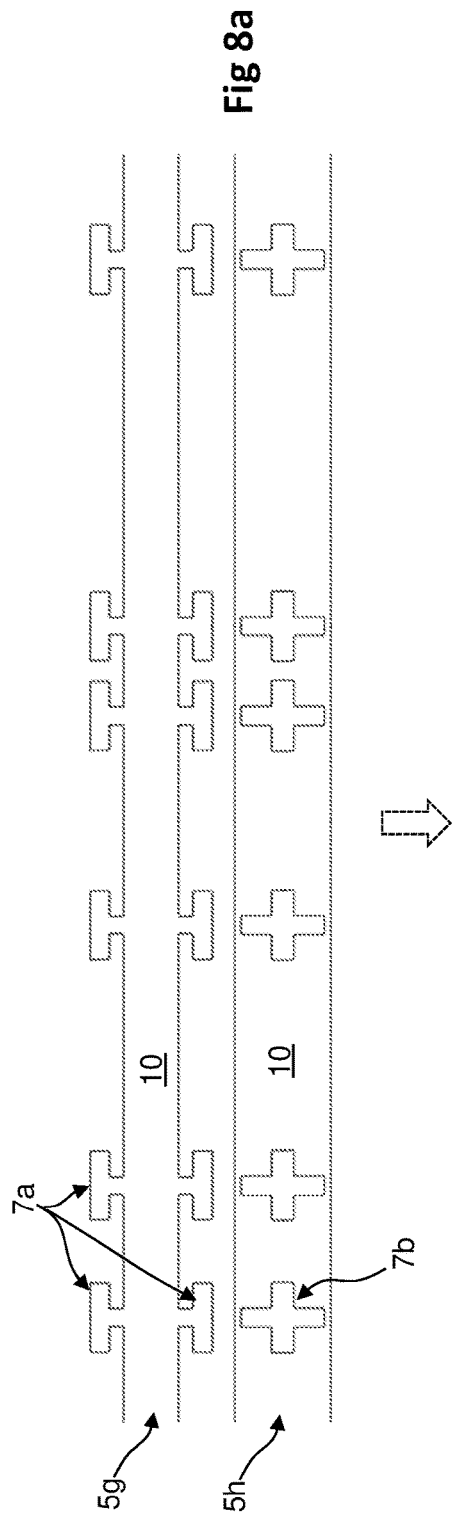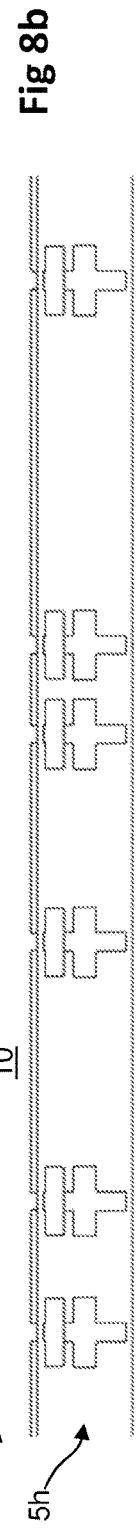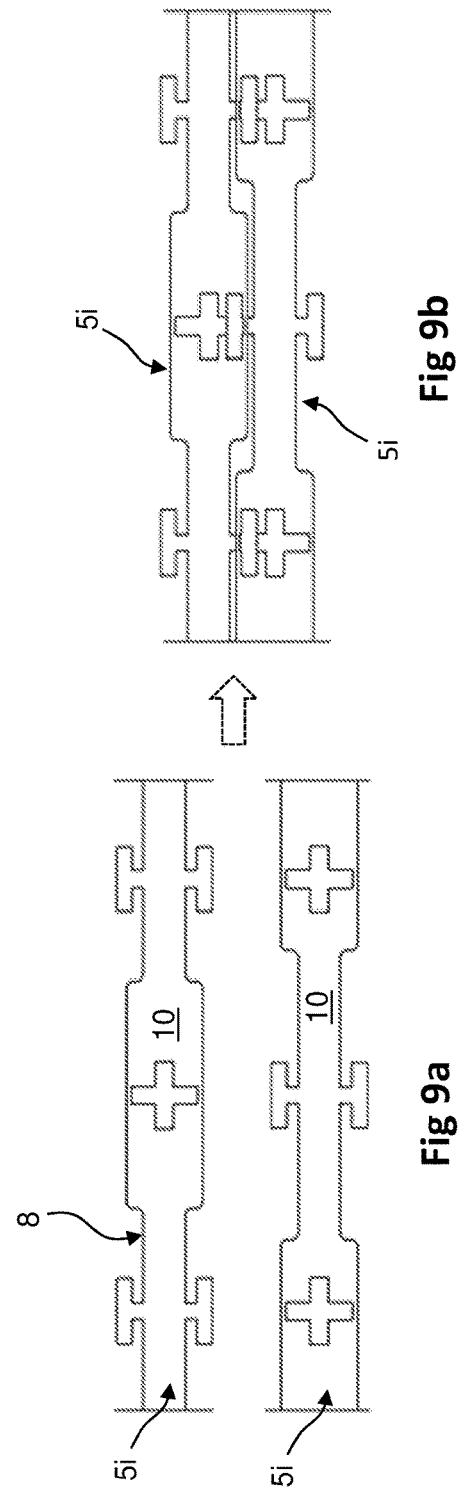

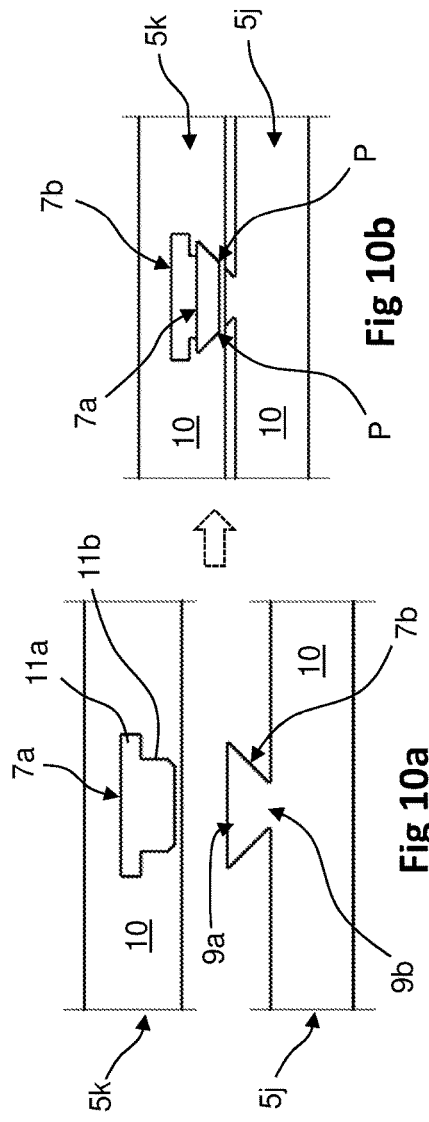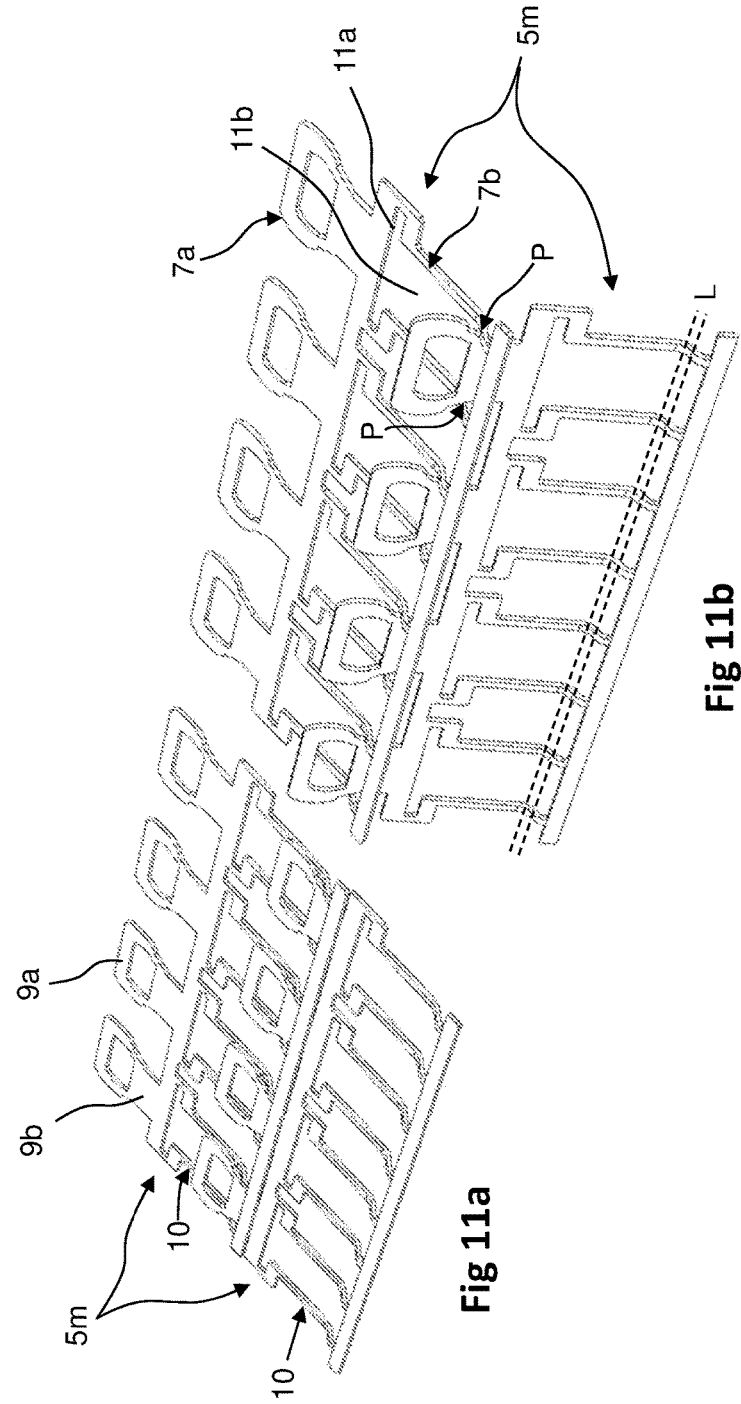

LINK INTENDED FOR A FLEXIBLE MAT IN A POINTING DEVICE

CROSS-REFERENCE TO RELATED APPLICATION

This application is a National Phase of International Application Number PCT/SE2022/000003, filed May 20, 2022 which claims priority to and the benefit of Sweden Patent Application Number 2100082-3, filed May 21, 2021, the disclosures of which are incorporated herein by reference in their entireties.

TECHNICAL FIELD

The present invention relates primarily, but is not limited to, to a link for use in a flexible mat, endless band or elliptic cylinder intended for a pointing device to control the movement of a pointer/cursor on a monitor/display for e.g. a computer or similar electronic device. The invention is particularly intended for enabling a pointing device to be manufactured so thin, and with such a low construction height, that it will be suitable for installation, for example in a laptop computer or similar devices.

PRIOR ART

The normal and common pointing device today is the mouse which is dominant on the market for e.g. desktop computers. However, the mouse has a significant disadvantage, namely that the user has to move his/her hand from the keyboard and place it over the mouse in order to move the cursor on the monitor/display. The mouse is also directly unsuitable in cases where a work table is missing or if the space next to the computer is limited. Therefore, various alternatives to the mouse have been developed, of which the so-called touchpad is now integrated in virtually all laptop computers. The touchpad does not have the mentioned disadvantages but often gives a less precise movement of the cursor on the monitor/display due to the finger's contact surface against the touchpad, and not the actual movement of the finger, being detected. The fact that the finger must slide against the solid surface of the touchpad, with accompanying friction, is also often perceived as negative by the user. These disadvantages result in many laptop computer users not using the built-in touchpad but instead using a connected mouse where possible.

So called tablets have now gained great popularity and a wide market. Unfortunately, these devices do not have a physical keyboard, which means that work cannot always be performed efficiently with these devices. Therefore, many of these tablets offer an external keyboard, and an external mouse is also often used alongside this. Alternatively, the user must use the monitor's/display's "touch" function, which reduces efficiency, precision and ergonomics. There are also pointing devices on the market that are placed between the user and the keyboard, designed with a rigid cylinder or rod rotatable and displaceable/translatable in one seat. Rotation of the cylinder moves the cursor vertically on the monitor/display and axial movement/translation of the cylinder (sideways) moves the cursor horizontally on the monitor/display. The advantage of pointing devices of this type is that the user only has to move the hand a short distance to reach the cylinder with the retained advantage that the response between the movement of the cylinder and the movement of the cursor on the monitor/display is as direct as in a conventional computer mouse. The cylinder can be easily moved, which results in good usability. A disadvantage of pointing devices of this type is that if the cylinder has a small diameter, the area that can be affected by the user also becomes small, which makes it difficult to effectively move the cursor for longer distances, especially in the vertical direction of the monitor/display. The larger the diameter of the cylinder, the larger the surface will be that the user can get in contact with, of course, but this is at the expense of the construction height of the pointing device becoming larger/higher. The consensus among ergonomists is that a pointing device of this type should be as thin as possible, which is made more difficult if the cylinder has a large diameter. The trend is also towards thinner keyboards, and the height of a pointing device of said type, which is placed next to a thin keyboard, should not be significantly higher than the height of the keyboard in order to achieve a comfortable working situation for the user.

A pointing device described, for example, in SE0201694-7 is currently on the market, which is also placed between the user and the keyboard. The pointing device comprises an axially rigid but tangentially easily bendable cylinder which encloses a flat elongated relatively thin plate or beam, arranged so that its upper surface is parallel to the base on which the pointing device is placed. The upwardly directed surface of the cylinder can be reached and moved in two dimensions by the user, substantially parallel to the upper support surface of the beam, through an opening in the housing of the pointing device, on its upper side. This is achieved in that the cylinder is translatable arranged in its axial direction between end stops, and rotatable around the beam in all axial positions by means of two co-rotating rollers. The movement of the cylinder is detected opto-electronically, whereby e.g. a cursor is caused to move correspondingly on a display. The main advantage of this technology is that the pointing device can be manufactured with a significantly lower construction height than competing pointing devices with a comparable operating opening, built with a rigid cylinder or rod. Despite this, there are problems that limit how thin the construction height of a pointing device with this technology can be produced.

One problem is that the cylinder is made up of a thin weave/web, such as a thin fabric, which, although extremely flexible, can hardly be used in combination with rolls with a diameter of less than 6 mm. This is because the fabric has a "memory effect"; if the pointing device is left unused for a while, the parts of the fabric which are in a curved/bent state around the rollers tend to form more permanently in this curved state. If a user then wishes to move the cursor on the monitor/display vertically a short distance (i.e. the cylinder rotates slightly over the beam) and then releases the cylinder, the cylinder risks rotating back to its previous "rest position" or original position, which then moves the cursor on the monitor/display in an unacceptable manner. The impact of this memory effect increases with decreasing diameter of the rollers.

The part of the cylinder which is below the beam also needs to hang down a few millimeters, in order to reduce the tangential tension of the cylinder and thereby reduce the friction to a value which allows comfortable movement of the cylinder. This has further increased the thickness of the pointing device.

On the inside of a finished cylinder are thin strings of hard glue. On the outside of the cylinder are thin strings of silicone rubber. Manufacturing has started with a cut piece of fabric, glue has been applied in the form of strings on one side of the fabric and hardened to a hard condition, then silicone rubber has been applied in strings on the other side of the piece of fabric and hardened, whereby the cylinder has been closed via a narrow so-called overlapping joint, also using hardened adhesives. All this has proved to be very difficult and expensive to achieve in production. The rejection rate has been high.

Also according to WO2014/185847, a type of cylinder consisting of longitudinal link rods which are slidably mounted relative to each other via special links has been proposed. Such a cylinder has no memory effect but cannot be manufactured rationally due to its complexity, and the cylinder necessarily becomes so heavy that it becomes difficult for the user to maneuver, due to the longitudinal link rods having to be made thick, in order to attach and integrate the intermediate links and bearing pins used to connect the link rods to each other. The thickness of the link rods and their necessary width also prevent installation in thin pointing devices.

Prior art is thus drawn with the problem that not sufficiently thin mats/cylinders can be manufactured to e.g. be suitable to be built into, and used in, future electronic units with low construction height, such as e.g. laptop computers or stand-alone pointing devices adapted for thin keyboards, and which also do not have a mechanically "memory effect". The thinnest constructions of mats/cylinders that exist today, based e.g. on a mat of fabric, are also difficult to manufacture rationally and gives a high rejection rate which makes them costly to manufacture.

Prior art thus does not show or describe any practically and economically useful design of a tangentially bendable and flexible mat which is suitable for installation in, for example, small/thin computers or similar electronic units.

THE OBJECT OF THE INVENTION AND THE MOST IMPORTANT FEATURES

An object of the present invention is to solve the above-mentioned problems of the prior art and to demonstrate a link design that can be used to manufacture a flexible mat, elliptic cylinder or an endless band and where the links are able to form a very thin hinge mechanism that makes a flexible mat suitable to install and use in thin electronic devices and where interconnected links still are able to rotate or turn relative to each other at least to a limited degree.

A further object of the invention is that the links in the flexible mat should have a sufficient axial stiffness/rigidity so the mat will not deform or collapse when used and therefore always secure that the position of the cursor on the display will be accurate.

A further object of the invention is that the play between adjacent links should be substantially eliminated so that even small movements of a part of the flexible mat, are conveyed to the part of the flexible mat where its movement is detected.

A further object of the invention is that the link design should provide minimal tangential stiffness and not add any memory effect so that the flexible mat easily can rotate around the support/beam and remain exactly in the position the user has left it, and remain in that position.

A further object of the invention is that the link should provide sufficient mechanical durability so that it or the flexible mat is not deformed plastically, e.g. when the user forcefully strives to spread two or more fingers that are in contact with the flexible mat.

A further object of the invention is that the link and therefore the flexible mat/cylinder should be possible to be manufactured with low weight, which in turn minimizes friction that otherwise needs to be overcome when the user moves the flexible mat.

A further object of the invention is to achieve minimal friction between adjacent links during moving/rotation of the links/flexible mat.

A further object of the invention is that the design of the link according to the invention should be simple and cost-effective to manufacture.

A further object of the invention is that pointing devices comprising links according to the invention should be able to work and be used as an accessory for computers and similar devices existing on the market.

The present invention eliminates the disadvantages of prior art and makes it possible to manufacture very thin links and thereby flexible mats. The memory effect of a flexible mat made from the link according to the invention is eliminated. The risk of a deformation of the flexible mat during operation will be reduced/eliminated so that every mechanical movement of the links or the flexible mat is detected with the least possible distortion/distortion. And a very low construction height of a pointing device can be achieved due to the invention.

The above-mentioned and further objects and advantages are achieved according to the invention by a link defined in claims 1-xx, a flexible mat according to claim xx, a method according to claim xx and the use of the invention according to claim xx.

SHORT DESCRIPTION OF THE INVENTION

The invention thus relates to the design of a link, preferably intended for, but not limited to, manufacturing a flexible mat shaped as an endless band or elliptic cylinder and primarily intended for use in an electronic device such as a pointing device, arranged to control the movement of a pointer/cursor on a monitor/display at, for example, a computer or similar device, and where the link is substantially rigid in its longitudinal/axial direction, the link consisting of, or are made of, a substantially disc-shaped material and having a base portion extending in the longitudinal/axial direction of the link.

The invention is mainly characterized in that the link includes at least one, preferably a plurality, of coupling means, connected to or arranged/integrated in, the base portion of the link, and that the coupling means are of a first type and/or a second type where the first type is protruding from the links base portion and the second type is formed by an opening preferable arranged in the base portion of the link. The coupling means of the first type, arranged in a first link, is further adapted to be at least partially inserted/located in or through a coupling means of the second type, arranged in a second adjacent link and the link and/or its coupling means are bent/curved at least along one line arranged in the axial direction of the link, wherein the links will remain rotatable or turnable a limited angle relative to another adjacent link.

The coupling means of the first and second type forms, when interconnected, a very thin hinge mechanism and two adjacent links are by help of at least two, preferably several, pairs of coupling means forming a hinge system making it possible to manufacture a very thin flexible mat.

The link is made of a material of substantially uniform thickness, such as e.g. of a substantially flat or disc-shaped material or a foil, that the link comprises coupling means with contact edges oriented parallel to the imaginary center line of the link, or oriented at an angle relative to the center line of the link; said contact edges are arranged to form/define self-adjusting bearing points between adjacent links when the coupling means are interconnected and the flexible mat is at least somewhat stretched in its direction of rotation. The design of the contact edges can be varied in a number of different ways within the scope of the invention. An angular difference between the contact edges, of two interconnected coupling means, has been found to reduce the noise problem from the flexible mat when used.

The link and/or its coupling means are also bent along at least one bending line, arranged along the axial direction of the link and where said bending line extends substantially parallel to an imaginary center line of the link. The bending of the link may also be arranged with a radius forming a partially or a fully curved link, as seen in the links end view.

The invention is also characterized in that the link is provided with a base portion extending in the axial direction of the link, and that at least one, preferably a number, of coupling means are arranged in, or to, the base portion of each link, and that at least one of a links coupling means is arranged in the form of an opening in the base portion of the link.

The invention is further characterized in that the link or its coupling means are not made of a wire-shaped material/goods, i.e. does not consist of a substantially round wire of metal. Making the link from wire-shaped goods/material would result in a substantially thicker link resulting in a thicker flexible mat, compared to a link made from a substantially plate- or foil-shaped material, which would counteract the object of the invention. There are other problems with wire-shaped material as well, in that such a link will not be rigid enough in its axial direction and therefore too weak for the intended purpose. These problems are solved by the present invention.

The links according to the invention is intended to make it possible to produce a flexible mat arranged to form an endless band or elliptical cylinder and is thus made up of a number of mutually rotatable, axially substantially rigid, links that are intended to lie or rest against some form of support mean, e.g. a mainly flat beam.

At least the upper part of the flexible mat, is intended to rest against the support, which is typically arranged parallel to the basis/table on which the pointing device is in turn located.

The invention also includes the use of a link for producing a flexible mat intended for a pointing device.

Further features and advantages of the invention will become apparent from the following, more detailed description of the invention, and from the accompanying drawings and claims.

BRIEF DESCRIPTION OF THE DRAWINGS

The invention is described in more detail below in the form of some preferred embodiments and with reference to the accompanying drawings.

FIG. 2a shows two equal links designed according to the invention, here located adjacent to each other but not mechanically interconnected. To the left in the figure are also shown end views of the links indicating where and how the links can be bent in order for the links to be able for them to lie substantially flat on a support/beam (not shown) in the links interconnected state.

FIG. 2b shows the two links from FIG. 2a but mechanically connected and locked to each other in a way that still permit them to turn/rotate a limited angle in relation to each other.

FIG. 3 shows two links according to the present invention but slightly different from the links shown in FIGS. 2a,b. The links are here located adjacent to each other but are not interconnected to each other.

FIG. 4a shows two equally designed links of a different and more simplified construction compared to what is shown in FIGS. 2a,b and 3.

FIG. 4b shows the links in FIG. 4a but interconnected to each other in such a way that they are possible to turn/rotate a limited angle in relation to each other.

FIG. 4c shows a link as shown in FIG. 4a where measurements of the first type and second type of coupling means is indicated, related to the links axial direction and in right angle to the link.

FIG. 6a shows another example of a different design of links and their coupling means. The links are here not interconnected with each other.

FIG. 6b shows the links from FIG. 6a but here mechanically mounted together, i.e. interconnected with each other.

FIG. 6c shows one of the links indicated in FIG. 6a where the letter "B" show the dimension of the second type of coupling means center part, below referred to as the "entrance", measured in right angle to the links axial direction.

FIG. 7a shows a similar design of links as shown in FIGS. 6a and 6b however a somewhat different design of the second link as it has both the first type and the second type of coupling means.

FIG. 7b shows the links in FIG. 7a in an interconnected state.

FIG. 8a shows another embodiment of links according to the invention where different links have different coupling means.

FIG. 8b shows the links in FIG. 8a in an interconnected state.

FIG. 9a shows a link design where the base portion does not have straight edges and where the base portion of the link therefore has a changing width.

FIG. 9b shows the links in FIG. 9a in an interconnected state.

FIG. 10a shows a further embodiment of the invention. For the matter of simplicity only one pair of coupling means are shown in the figure. One coupling means is of a first type and the other is of a second type.

FIG. 10b shows the links in FIG. 10a interconnected.

FIG. 11a show a further embodiment of the invention, a light weight link.

FIG. 11b show the two links in FIG. 11a in a state where they are rotated into an angle in relation to each other.

DESCRIPTION OF PREFERRED EMBODIMENTS

Figure 1:
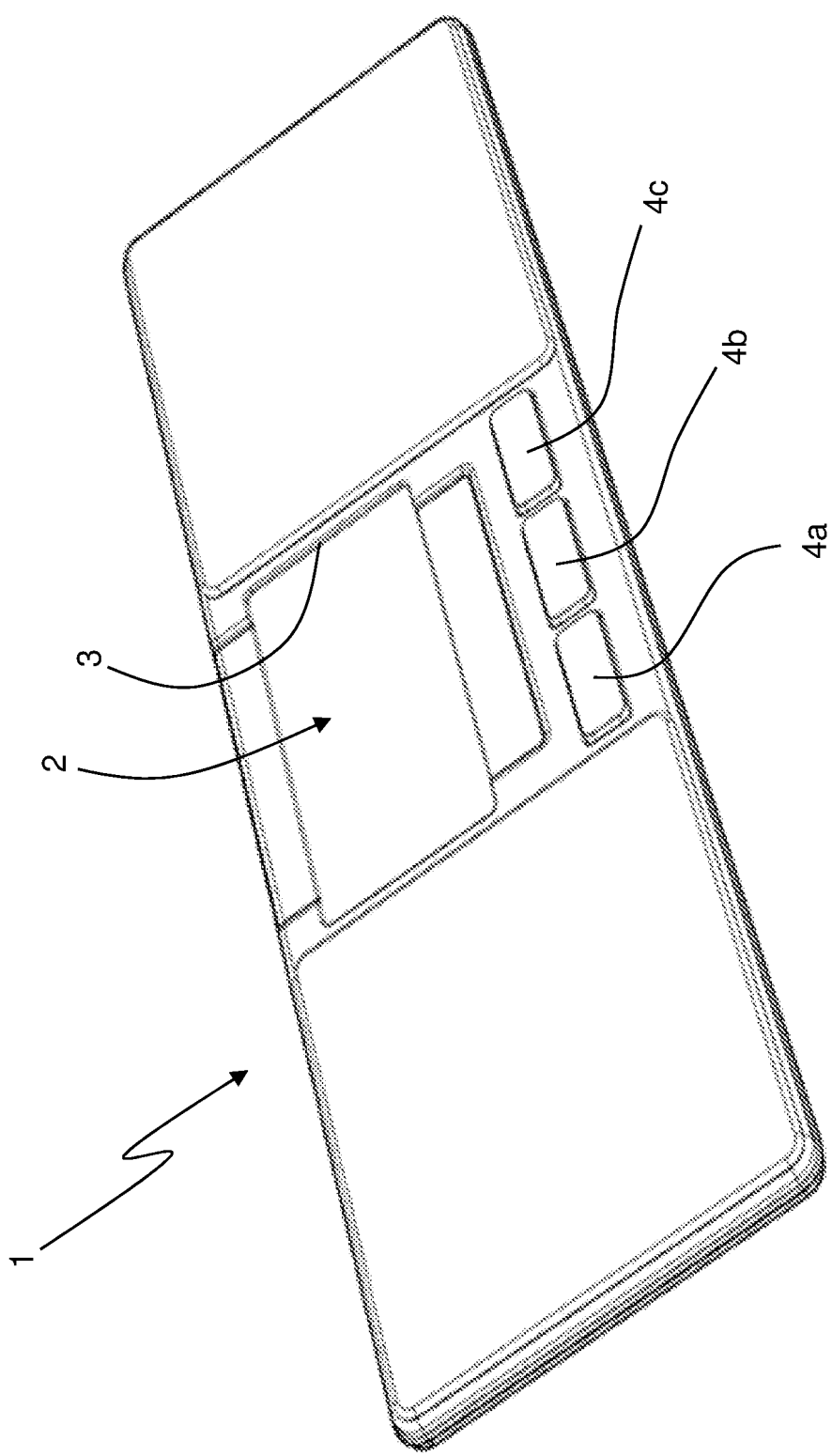
FIG. 1 shows a perspective drawing from above of a pointing device having a flexible mat made of links according to the invention.

FIG. 1 shows a perspective view of a pointing device 1 intended to be located between a user and a keyboard, where the keyboard in turn is connected to a computer (not shown). The pointing device 1 is provided with a flexible mat 2 that can be manually reached and activated by the user, via an upwardly directed operating opening 3 in the pointing device 1.

The flexible mat 2 is typically formed as an endless band, or an elliptic cylinder, that can be rotated around a support beam in the pointing device (not shown). The operating opening 3 in the pointing device 1 exposes at least a part of the surface of the flexible mat 2. A user can there move the flexible mat 2 with one or more fingers and move it optionally in two directions/dimensions, laterally and transversely, in relation to the pointing device 1. The pointing device 1 suitably also has buttons 4a-c for useful functions not specified here.

The flexible mat 2 consists of a number of thin and elongated links that are rotatably connected to each other (not shown). The flexible mat 2 is typically tangentially stretched/tensioned so it will stay flat on the support/beam.

When the user manually/mechanically moves the flexible mat 2, i.e. rotates or displaces the flexible mat 2 in axial direction or performs a combination of these movements, the movement of the flexible mat 2 is detected by a sensor (not shown), and information about the movement is transmitted in the form of an electrical signal to, for example, a connected computer, resulting in e.g. that a cursor moves in a similar way as the flexible mat but on the monitor of the computer (not shown). The sideways movement of the flexible mat 2, i.e. in its axial direction, thus suitably gives rise to a horizontal movement of the cursor on the monitor and rotation of the cylinder gives rise to a vertical movement of the cursor on the monitor. Diagonal movements of the cursor are a combination of said movements of the flexible mat 2 and the cursor can thus be moved in all two-dimensional directions on the display/screen.

FIG. 2a shows two identical links 5a designed according to the invention, located side by side but not mechanically interconnected. To the left in the figure are shown end views 6a of each link 5a indicating where and how the links 5a may be bent in order for the links 5a to be able to lie flat on a support/beam and for making the links 5a turnable/rotatable in relation to each other in their interconnected state. In FIGS. 11a,b and 12a-f is shown in more detail examples of how a link 5a according to the invention may be bent.

Each link 5a has at least one, preferably several or many, coupling means 7a,b. The coupling means 7a,b make it possible to connect the links 5a to each other forming a flexible mat 2. The coupling means 7a,b in the link 5a are here distributed symmetrically along the link 5a and basically designed as two different types, a first type of coupling means 7a and a second type of coupling means 7b.

The first type of coupling means 7a is arranged as a protruding element mechanically connected/fixed to, or integrated with, the link 5a, preferably connected to the edge 8 of a long side of the link 5a. The first type of coupling means 7a is in this figure substantially T-shaped having a connecting part 9b and a locking part 9a. The connecting part 9b is fixed to, or integrated with, the links 5a base portion 10. The locking part 9a of the first type of coupling means 7a is designed with a greater dimension/width then its connecting part 9b, as seen in the links 5a axial direction.

A second type of coupling means 7b is preferable located in, or integrated in, the base portion of the link 5a, arranged as an opening or recess in the base portion 10. This second type of coupling means 7b are in this figure also substantially T-shaped having an entrance 11a and an narrow part 11b, where the entrance 11a is designed with a greater width than its narrow part 11b, measured it the links axial direction.

And The narrow part 11b of the second type of a coupling means 7b is typically somewhat wider than the connecting part 9b of the first type of coupling means 7a and the locking part 9a of the first type of coupling means 7a is wider than the narrow part 11b of the second type of coupling means 7b. This results in that this pair of the two types of coupling means 7a,b can be interconnected, and mechanically locked, to each other.

The links base portion 10 and the first type of coupling means 7a can be integrated to each other, either by that the first type of coupling means 7a are fixedly mounted, by welding, gluing or in any other suitable way, to the links 5a base portion 10, preferable to the links 5a long side edge 8, or by that the link 5a and the coupling means 7a are made out of one and the same piece of material. The second type of coupling means 7b are arranged as an opening/recess in the base portion 10 of the link 5a.

The material of the link 5a is typically flat formed and of a substance that meets the necessary properties regarding quality, durability and stiffness. The substance can be any material such as stainless steel, fiberglass, plastic, any other metal etc. The link 5a and its coupling means 7a may also be made of a metal foil, preferably a foil of stainless steel.

The link 5a and its coupling means 7a,b consist of a goods/material with a thickness of up to 1 mm, and is preferably made of a foil-shaped goods/material with a thickness of between 0.025-0.300 mm. The link 5a and its coupling means 7a,b can as an example be punched, laser cut or etched out of the material. It is also possible that the links 5a can be produced in a 3D-printer.

In FIG. 2a the locking part 9a of the first coupling means 7a is designed with outer angled contact edges 12a adapted to engage with inner contact edges 12b of the second type of coupling means 7b. In this way bearing points "P" arise between the coupling elements 7a,b when they are interconnected. The angled design makes the bearing points "P" mechanically self-adjusting reducing any play between the links 5a. This results in lower noise from the links and from the flexible mat 2 when used.

The contact edges 12a,b of the coupling means 7a,b, are preferably arranged at an angle ($\alpha$) of between 0-90 degrees relative to the axial direction of the links 5b. In this case, the angle ($\alpha$) for the contact edges 12a arranged in the first type of coupling means 7a is 45 degrees.

The edges 12a,b of the coupling means 7a,b may be arranged with a mutual angular difference as can be seen in this figure, i.e. the contact edges (12a,b) of the coupling means (7a,b) in two adjacent links (5a-m) are arranged with different angles in relation to the axial direction of the links.

FIG. 2b shows the two links 5a from FIG. 2a but here mechanically connected and locked to each other in a way that still permit the links 5a to turn/rotate a limited angle in relation to each other. To the left in the figure is shown an end view 6b of the interconnected links 5a.

The first type of the coupling means 7a in a first link 5a is here connected to a second type of coupling means 7b in a second adjacent link 5a. When interconnecting the links 5a the first type of coupling means 7a on a first link 5a are adapted to be at least partly inserted into and/or through the second type of coupling means 7b in the adjacent link 5a and when the two links 5a thereafter is somewhat stretched apart, i.e. by a mechanical tension, the coupling means 7a,b locks to each other and can only be separated if the mechanical tension decreases/ends.

The links 5a in a flexible mat 2 will therefore stay safely connected to each other in a pointing device 1 where the flexible mat 2 always will be under mechanical tension.

The contact edges 12a,b of the coupling means 7a,b, the outer edges of the first type of coupling means 7a and the inner edges of the second type of coupling means 7b, form bearing points "P" when mechanically interconnected. This creates a substantially play-free and friction-free rotation/turning of the links 5a relative to each other.

FIG. 3 shows two links 5b according to the present invention but with a slightly different design compared to the links 5a shown in FIGS. 2a,b. The links 5b are located adjacent to each other but are, in this figure, not interconnected to each other. In this case both coupling means 7a,b are arranged with contact edges 12a,b that are inclined/angled. The contact edges 12a,b are forming self-adjusting bearing points "P" when the coupling means 7a,b are mechanically interconnected. This design allows a substantially play-free and friction-free rotation/turning of the links relative to each other.

FIG. 4a shows two identical links 5c of a different and simplified design compared to what is shown in FIGS. 2a,b and 3. Here the first coupling means 7a is substantially T-shaped and protruding outwardly from the links base portion 10 and its long side edge 8, substantially in right angle in relation to the links axial direction. The second type of a coupling means 7b are formed by openings arranged in the base portion 10 of the link 5c and are here also substantially T-shaped. The first type of the substantially T-shaped coupling means 7a having a connecting part 9b and a locking part 9a. The connecting part 9b is mechanically fixed to (i.e. by welding, gluing etc.), or integrated with, the links 5c base portion 10. The second type of coupling means 7b are arranged/integrated inside the links 5c base portion 10.

FIG. 4b shows the links 5c in FIG. 4a mechanically connected to each other in such a way that they are possible to turn/rotate a limited angle in relation to each other.

FIG. 4c shows a link 5c as shown in FIG. 4a where dimensions of the parts the first type and second type of coupling means 7a,b is indicated. The dimensions are related to the links 5c axial direction as well as in right angle to the link 5c. "A" is the height of the locking part 9a, "B" is the width of the connecting part 9b, "C" is the width of the locking part 9a, "D" is the height of the entrance 11a, "E" is the width of the entrance 11a and "F" is the width of the narrow part 11b.

The width "F" of the narrow part 11b of the second type of coupling means 7b is arranged at least somewhat wider than the width "B" of the connecting part 9b of the first coupling means 7a, measured in the axial direction of the link 5.

The width "E" of the entrance 11a of the second type of coupling means 7b is typically at least somewhat wider than the width "C" of the locking part 9a of the first coupling means 7a, measured in the axial direction of the link, permitting the locking part 9a to be inserted in the entrance 11a.

The width "C" of the locking part 9a of the first type of coupling means 7a is at least somewhat wider than the width "F" of the narrow part 11b of the second coupling means 7b, measured in the axial direction of the link.

Figure 5B:
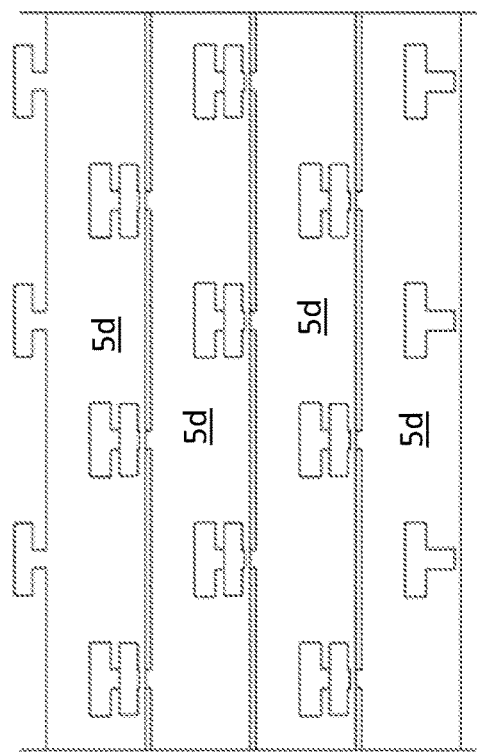
FIG. 5b shows the links according to FIG. 5a but here interconnected to each other.
Figure 5A:
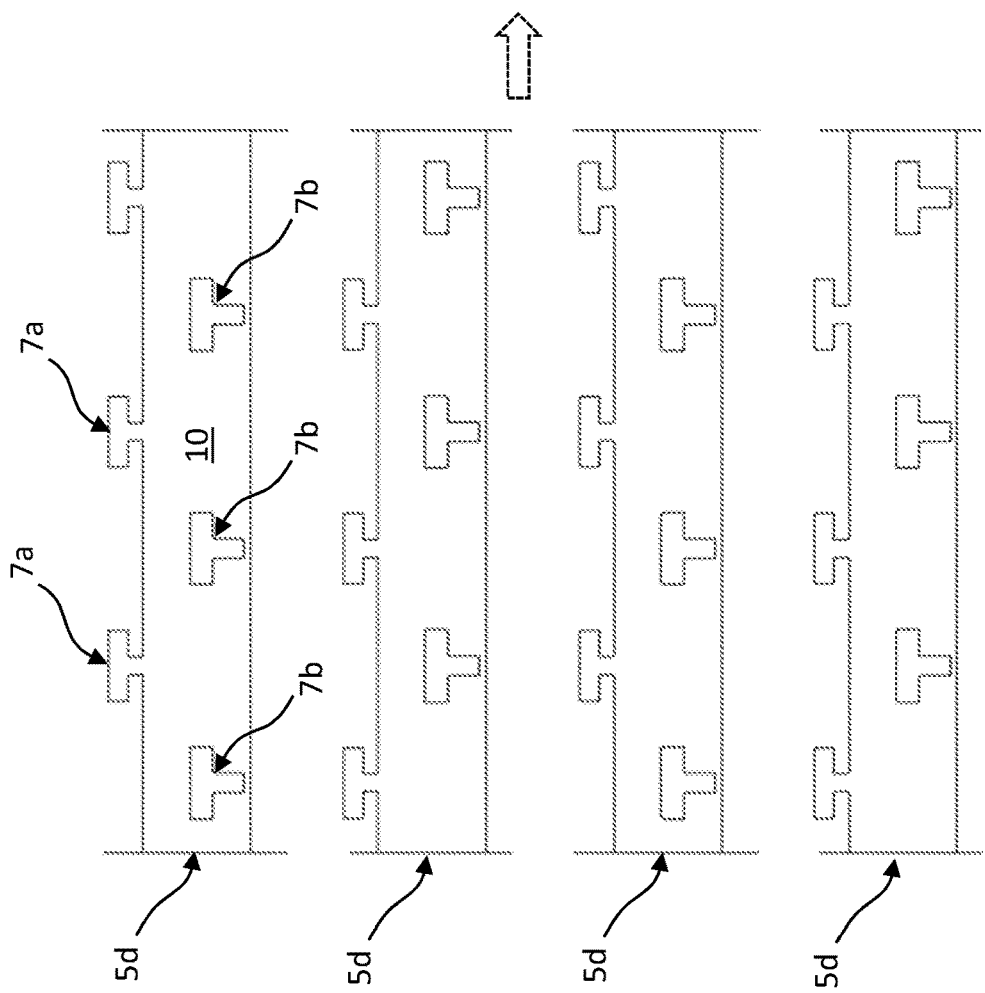
FIG. 5a shows a variant of links, similar to the ones shown in FIG. 4a-c, where the two types of coupling means are located offset each other in the respective link.

FIG. 5a shows a variant of links 5d, as compared to FIGS. 4a and 4b. The coupling means 7a,b on the links two sides are here distributed offset in relation to each other. With this design it is still possible to use only one type of link 5d for making a complete flexible mat 2 but each link 5d has to be connected offset to the previous link 5d.

FIG. 5b shows the links 5d according to FIG. 5a but here interconnected to each other.

FIG. 6a shows another example of a further different design of links 5e,f and their coupling means 7a,b. Five links 5e,f are here shown separated from each other. Here are used two different link designs, one link 5e is arranged with a first type of coupling means 7a which are protruding from both long sides of the links base portion 10 and one other link 5f having only the second type of coupling means 7b, arranged as openings in the base portion 10 of that link 5f.

FIG. 6b shows the links 5e,f in FIG. 6a but mechanically interconnected with each other.

FIG. 6c shows the link 5f indicated in FIG. 6a having a coupling means that is a combination of two coupling means 7b of the second type.

In this combined coupling means "D" is indicating the height of the entrance 11a, measured at right angle to the links 5f axial direction, "E" is indicating the width of the entrance 11a measured along the axial direction of the link and "F" indicates the width of the narrow part 11b of the combined coupling means, also measured along the axial direction of the link 5f.

Two coupling means of the second type 7b is creating one substantially "plus"- or "cross"-shaped opening with two opposite located narrow parts 11b and one centrally located entrance 11a there between, arranged in the base portion 10 of the link 5. The advantage is that when the first and second type of coupling means are interconnected, and the links thereafter are straightened out, the risk for separation of these coupling means, and implicit the links, will be reduced or eliminated.

FIG. 7a shows a similar design of links 5c,f as shown in for example FIGS. 6a and 6b however one first link 5f only have the second type of coupling means 7b.

The first type of coupling means 7a are protruding from one side of the second links 5c base portion 10 and the second type of coupling means 7b are arranged in the base portion 10 of that link 5f.

The assembly of a flexible mat 2 starts with the first central link 5f having the "plus"-shaped coupling means to which the second link 5c is connected on each side with its first type of coupling means 7a. Thereafter another links 5c are connected on both sides of the central link 5f, and so on.

FIG. 7b shows the links in FIG. 7a in an interconnected state.

FIG. 8a shows a further embodiment of links 5g,h according to the invention.

The main difference of these two links 5g,h, compared with other links 5a-f described above, is that the coupling means are not evenly distributed along the link 5g,h, but they are distributed "randomly" or located with different distances between each other. They can also be grouped unevenly as shown in the figure.

FIG. 8b shows the links 5g,h in FIG. 8a in an interconnected state.

FIG. 9a shows a link 5i where the base portion 10 does not have straight side edges 8. The base portion 10 of the link 5i therefore has different height along the axial length of the links, measured at right angles to the links axial direction. The links shown in this FIG. 9a may be identical but here showed located offset each other.

The link 5i is arranged with at least one coupling means of the first type 7a and one coupling means of the second type 7b both of which are arranged in order to, adapted to, connect to opposite coupling means 7a,b arranged in one adjacent link 5.

The technical effect and advantage of this is that the mechanical connection between such connected links 5i will be more safe/stable meaning that the links 5i will not easily be separated or disconnected, even if the stretching/tensioning of the flexible mat 2 will not always be at a desired level.

FIG. 9b shows the two links 5i in FIG. 9a in an interconnected state.

FIG. 10a shows a further embodiment of the invention. For the matter of simplicity only one pair of coupling means 7a,b, of a first type and a second type, are shown in the figure. The first type of a coupling means 7a is shown located on one link 5j and substantially here formed as a wide "V" having a connecting part 9b and a locking part 9a, where the locking part 9a is arranged with a greater width than the connecting part 9b, measured in the axial direction of the link 5j. A second type of a coupling means 7b is arranged in an adjacent link 5k as an opening having substantially the form of a "T" with a narrow part 11b and an entrance 11a where the entrance 11a is formed with a greater width than the narrow part 11b, measured in the links axial direction.

FIG. 10b shows the links in FIG. 10a interconnected. From this figure it is clear that the first type of coupling means 7a, and its link 5j, is locked to the second type of coupling means 7b, and its link 5k, by that the first type of coupling means 7a are adapted to be, and in this figure partly has been, at least partly inserted through the entrance 11a of the second type of coupling means 7b and in the next stage the links 5j,k has been pulled away from each other a small distance until the edges of the coupling means connects mechanically to each other forming bearing points "P" via which the links 5j,k are turnable a limited angle in relation to each other.

FIG. 11a show a further embodiment of the invention, a light weight link 5m. The figure show two identical links interconnected. In order to make the link 5m as light as possible material has been removed, "cut out", from the base portion 10 of the link 5m and from the locking part 9a of the coupling means 7a.

FIG. 11b show the two links in FIG. 11a but in a state where one link 5m is turned at an angle in relation to the other link 5m. The coupling means 7a,b of these two links 5m are mechanically still connected to each other via the bearing points "P" that occur between the outer edge of the first type of coupling means 7a and the inner edge of the second type of coupling means 7b.

In this figure it is also clear how the links 5m are bent along a bending line "L" arranged in the base portion 10 of the link 5m. To bend the link 5m in at least along one line "L" is necessary to produce a flexible mat 2 that lie flat on an underlying support/beam.

As can be seen from the FIG. 11b the height (dimension "D" in FIG. 4c) of the entrance 11a of the second type of coupling means 7b is smaller, or much smaller, than the corresponding height (dimension "A" in FIG. 4c) of the locking part 9a, of the first type of coupling means 7a, measured at right angle to the links 5m axial direction. The height (dimension "D" in FIG. 4c) of the entrance 11a is only somewhat larger, than the material's thickness of the first type of coupling means 7a adapted to allow the locking part 9a, of the first type of coupling means 7a, at least partially to be inserted/located in or through the entrance (11a) of the second type of coupling means (7b). By keeping this height (D) as small as possible the risk for the coupling means 7a,b and the links 5m to separate from each other, in their interconnected state, will be reduced or eliminated.

Even if the locking part 9a of the first type of a coupling means 7a is broader (measured at right angle to the links axial direction) than the entrance 11a of the second type of coupling means 7b the locking part 9a of the first type of coupling means 7a can easily be inserted into the entrance 11a of the second type of coupling means as it can be done in about right angle.

After the insertion the links 5m are straightened out and mechanically displaced apart somewhat from each other. As soon as the links are straightened out, the coupling means 7a,b will be safely interconnected and cannot separate.

Figure 12A:
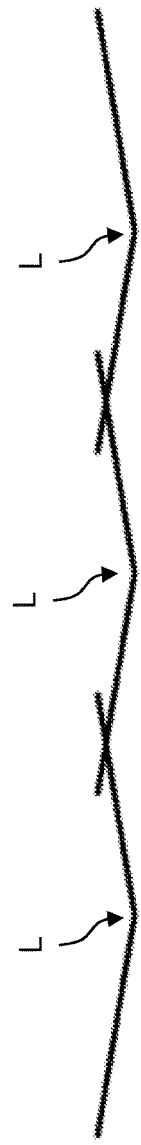
FIGS. 12a-12f show end views of links and their protruding coupling means and how each link can be bent in different ways.

FIGS. 12a-12f shows in end views how the links 5a-m and its coupling means 7a can be bent in many different ways, seen in the links end views. FIG. 12a shows for example links that are bent along one bending line "L", located in the center part of the link. The bending lines extends along the links whole axial direction.

Figure 12B:
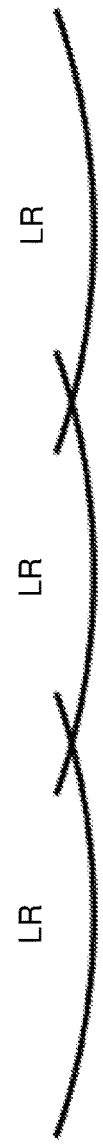
Figure 12C:
Figure 12D:
Figure 12E:
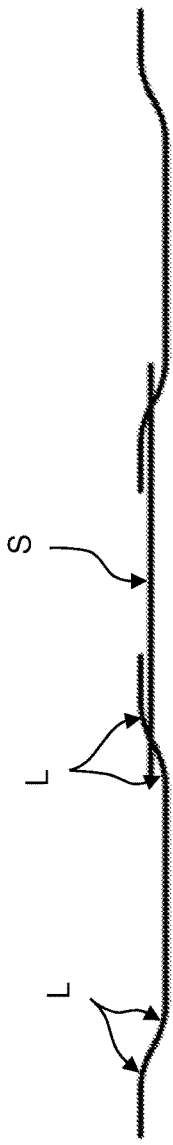
Figure 12F:

FIG. 12b on the other hand show links that are bent with a large radius along a line "LR" so that they are substantially curved/arcuate, seen from their end views.

FIGS. 12c-12f show further examples of how a link may be bent and in 12e is shown how bent links are combined with a link that is straight "S" (not bent at all). To include straight links when producing a flexible mat is possible if the adjacent links are bent according to the invention.

Bending the links and/or the coupling means enable the links, and the flexible mat to be positioned in an optimal way on an underlying support or beam. It is of utmost importance that the links, and the flexible mat, can rest with its links substantially flat on the support/beam in order for the user to be able to press the fingers against the flexible mat and manipulate the mat in a convenient, safe and effective manner.

The description above is primarily intended to facilitate the understanding of the invention and the scope of protection is not limited to the embodiments described here, but also other variants and embodiments of the invention are fully possible and conceivable within the scope of the inventive concept and the scope of the following claims.

The invention claimed is:

1. Links (5a-m) for manufacturing a flexible mat (2) for use in an electronic device, arranged to control the movement of a pointer or cursor on a monitor or display at a computer or similar device, and where at least one of the links is rigid in its axial or longitudinal direction, the at least one of the links being made of a substantially disc-shaped material, and having a base portion (10) extending in the axial direction of the at least one of the links, the at least one of the links including at least one coupling means (7a,b) and the at least one of the links or its coupling means (7a,b) being bent or curved at least along one line arranged in the axial direction of the at least one of the links, wherein, the at least one of the links and its coupling means (7a,b) comprising a material with a thickness of up to 1 mm, the coupling means (7a,b) being of a first type or a second type, the first type of coupling means (7a) protrudes outwardly from a base portion (10) of the at least one of the links, the second type of coupling means (7b) being integrated in and formed by an opening arranged in the base portion (10) of the at least one of the links, the first type of coupling means (7a) in the at least one of the links being adapted to be at least partially inserted or located in or through the second type of coupling means (7b) arranged in an adjacent link of the at least one of the links wherein each of the at least one of the links will remain rotatable or turnable to a limited angle relative to an adjacent one of the links.

2. The links (5a-m) according to claim 1, wherein the at least one of the links and the coupling means (7a,b) are made of a metal foil.

3. The links (5a-m) according to claim 1, wherein the first type of coupling means (7a) protrudes outwardly from the base portion (10).

4. The links (5a-m) according to claim 1, wherein the first type of coupling means (7a) has a connecting part (9b) and a locking part (9a).

5. The links (5a-m) according to claim 4, wherein the connecting part (9b) of the first type of coupling means (7a) is fixed to, or integrated with, a long side edge (8) of the at least one of the links.

6. The links (5a-m) according to claim 4, wherein the locking part (9a) of the first type of coupling means (7a) is designed with a greater width then the connecting part (9b), measured in the axial direction of the at least one of the links.

7. The links (5a-m) according to claim 1, wherein the second type of coupling means (7b) has at least one narrow part (11b) and one entrance (11a).

8. The links (5a-m) according to claim 7, wherein a width (F) of the narrow part (11b) of the second type of coupling means (7b) is arranged at least somewhat wider than a width (B) of the connecting part (9b) of the first type of coupling means (7a), measured in the axial direction of the at least one of the links.

9. The links (5a-m) according to claim 7, wherein a width (E) of the entrance (11a) of the second type of coupling means (7b) is at least somewhat wider than a width (C) of the locking part (9a) of the first type of coupling means (7a), measured in the axial direction of the at least one of the links.

10. The links (5a-m) according to claim 7, wherein a width (C) of the locking part (9a) of the first type of coupling means (7a) is at least somewhat wider than a width (F) of the narrow part (11b) of the second type of coupling means (7b), measured in the axial direction of the at least one of the links.

11. The links (5a-m) according to claim 7, wherein a height of the entrance (11a) of the second type of coupling means (7b) is smaller than the corresponding height of the locking part (9a), of the first type of coupling means (7a).

12. The links (5a-m) according to claim 7, wherein a height of the entrance (11a) is only somewhat larger than the material thickness of the first type of coupling means (7a) so as to be adapted to allow the locking part (9a), of the first type of coupling means (7a) to be at least partially inserted or located in or through the entrance (11a) of the second type of coupling means (7b).

13. The links (5a-m) according to claim 1, wherein the second type of coupling means (7b) is arranged in the base portion (10) of the at least one of the links and arranged as a substantially "plus"- or "cross"-shaped opening having two opposite located narrow parts (11b) and there between one centrally located entrance (11a).

14. The links (5a-m) according to claim 1, wherein the at least one of the links is arranged with at least one first type of coupling means (7a) and one second type of coupling means (7b) both of which are adapted to connect to one adjacent link having corresponding coupling means (7a,b).

15. The links (5a-m) according to claim 1, wherein the at least one of the links or its coupling means is bent at a large radius (LR) giving the at least one of the links a partially or a fully arched or curved form.

16. The links (5a-m) according to claim 1, wherein contact edges (12a,b) are arranged in the coupling means (7a,b) to create bearing points (P) that are play-free and substantially friction free at rotation or turning of the links (5a-m) relative to each other when the coupling means (7a,b) are mechanically interconnected.

17. The links (5a-m) according to claim 16, wherein the contact edges (12a,b) of the coupling means (7a,b) in two adjacent links (5a-m) are arranged with different angles in relation to the axial direction of the links (5a-m).

18. A method of manufacturing the links (5a-m) according to claim 1, wherein the at least one of the links and its coupling means (7a,b) are punched, laser cut or etched from a metal plate or from a foil-shaped material.

19. A flexible mat (2) having at least one of the links according to claim 1, wherein the at least one of the links includes coupling means (7a,b) of a first type, a second type, or both.

20. The links (5a-m) according to claim 1, wherein the at least one of the links (5a-m) and its coupling means (7a,b) further comprises a foil-shaped material with a thickness of between 0.025-0.3 mm.

\* \* \* \* \*